United States Patent [19]

Takada et al.

[11] Patent Number: 5,033,331

[45] Date of Patent: Jul. 23, 1991

[54] HYDRAULIC CONTROL DEVICE FOR AUTOMATIC TRANSMISSION FOR VEHICLE HAVING CLUTCH OPERABLE IN TWO SPEED STAGES AND TWO PARALLEL HYDRAULIC PRESSURE SUPPLY PASSAGES THEREFOR

[75] Inventors: Mitsuru Takada; Hiroshi Itoh, both of Toyota; Tokuyuki Takahashi, Aichi; Makoto Funahashi, Toyota, all of Japan

[73] Assignee: Toyota Jidosha Kabushiki Kaisha, Toyota, Japan

[21] Appl. No.: 388,516

[22] Filed: Aug. 2, 1989

[30] Foreign Application Priority Data

Aug. 2, 1988 [JP] Japan ................................ 63-192965
Sep. 7, 1988 [JP] Japan ................................ 63-224328
Feb. 28, 1989 [JP] Japan .................................. 1-47027

[51] Int. Cl.⁵ ............................................. B60K 41/06
[52] U.S. Cl. ......................................... 74/867; 74/868
[58] Field of Search ................................. 74/867, 868

[56] References Cited

U.S. PATENT DOCUMENTS

| | | | |
|---|---|---|---|
| 3,401,581 | 9/1968 | Chana .................................... | 74/868 |
| 3,631,744 | 1/1972 | Blomquist et al. .................... | 74/868 |
| 4,274,308 | 6/1981 | Iwanaga et al. ....................... | 74/868 |
| 4,722,251 | 2/1988 | Sumiya et al. ........................ | 74/867 |

*Primary Examiner*—Allan D. Herrmann
*Assistant Examiner*—Ryan W. Massey
*Attorney, Agent, or Firm*—Oblon, Spivak, McClelland, Maier & Neustadt

[57] ABSTRACT

For an automatic transmission for a vehicle including a speed stage shifting device such as shown in FIG. 1 in which the clutch $C_1$ is adapted to be engaged when the 2nd speed stage and the 3rd speed stage are set up and disengaged when the 4th speed stage is set up, the engagement of the clutch $C_1$ being essential for setting up the 2nd speed stage while the engagement of the clutch $C_1$ is not essential for setting up the 3rd speed stage unless engine brake availability is required, a hydraulic control device includes a first passage 235 and a second passage 329 for supplying a hydraulic pressure to the clutch $C_1$ in parallel with one another, the first passage having a substantially less fluid flow resistance than the second passage, and a fluid flow switching over mechanism including a 1-2 shift valve 210 and a $C_1$ control valve 300 for alternatively communicating the first or the second passage while interrupting the second or the first passage according to whether the 2nd speed stage or the 3rd speed stage is set up. An accumulator 450 may be provided in the second passage 329. Further, a one way valve 469, or more desirably a parallel connection of the one way valve 469 and an orifice 467 may be provided between the accumulator and the clutch $C_1$.

4 Claims, 7 Drawing Sheets

| RANGE | SPEED STAGE | FIRST SOLENOID (400) | SECOND SOLENOID (410) | THIRD SOLENOID (420) | C1 (38) | C2 (40) | C3 (42) | C4 (44) | B1 (46) | B2 (48) | F1 (34) | F2 (36) | REMARKS |
|---|---|---|---|---|---|---|---|---|---|---|---|---|---|
| R | ALLOWED |  |  | O |  |  | O |  |  | O |  |  | ABOVE A PREDETERMINED SPEED |
|  | INHIBITED | O |  |  | O |  |  |  |  |  |  |  |  |
| D | 1st | O |  |  | O |  |  |  |  |  |  | O |  |
|  | 2nd |  |  | O | O |  |  |  |  |  | O | O |  |
|  | 3rd |  | O | O | O | O |  |  |  |  | O |  |  |
|  | 4th |  | O | O | O | O |  | O |  |  |  |  |  |
| S | 1st | O |  |  | O |  |  |  | O |  |  | O |  |
|  | 2nd | O |  |  | O |  |  | O |  |  | O | O |  |
|  | 3rd |  | O |  | O | O |  | O |  |  |  |  | WHEN SOLENOID VALVE FAILED |
|  | (3rd) | ⊙ |  |  | ⊙ | ⊙ |  | ⊙ | ⊙ |  | ⊙ |  |  |
| L | 1st |  |  |  | ⊙ |  |  |  | ⊙ |  | ⊙ | ⊙ |  |
|  | 2nd | ⊙ |  |  | ⊙ |  |  | ⊙ |  |  | ⊙ | ⊙ | WHEN SOLENOID VALVE FAILED |
|  | (2nd) | ⊙ |  |  | ⊙ |  |  | ⊙ |  |  | ⊙ | ⊙ |  |

*FIG. 2*

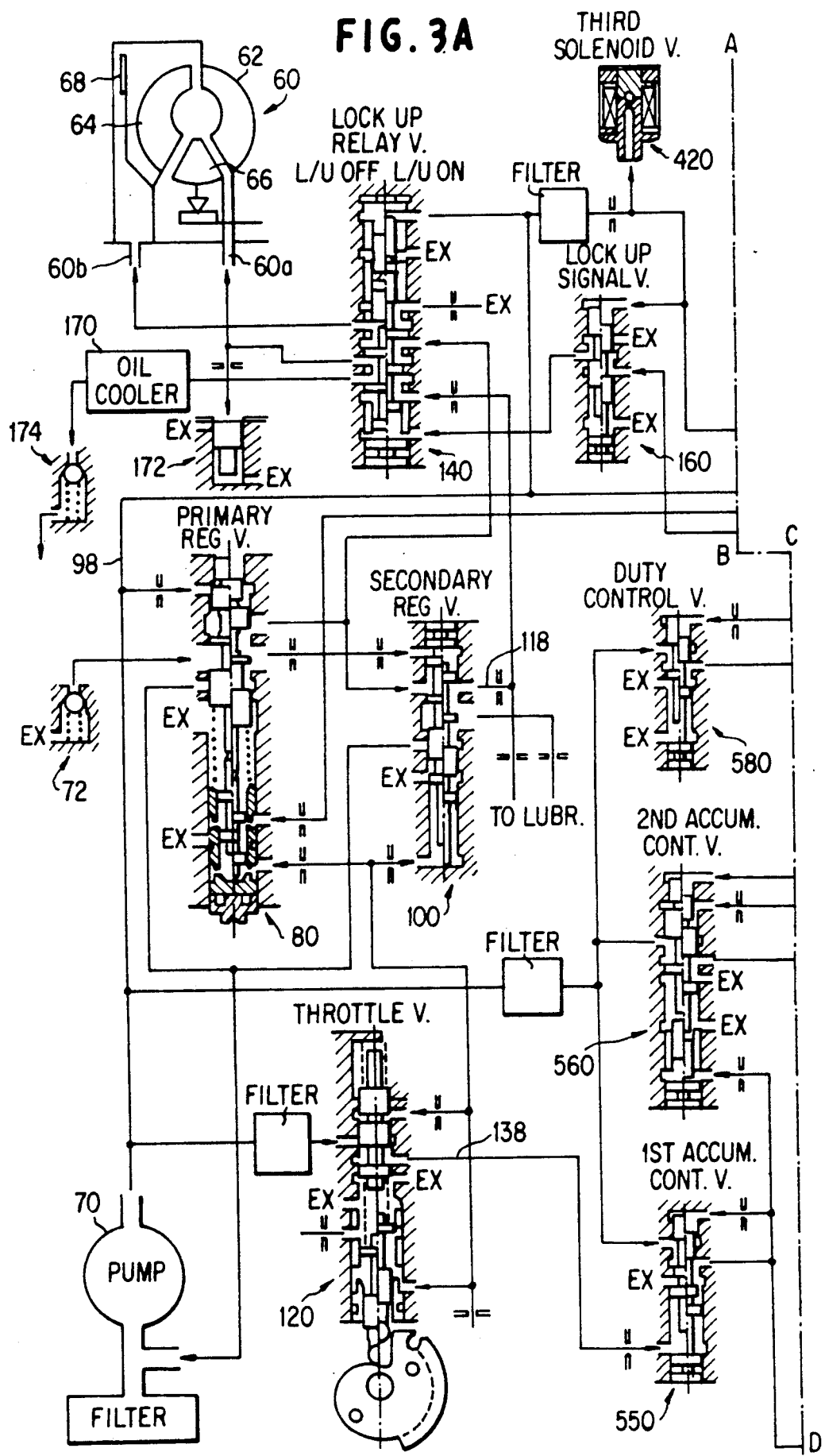

HYDRAULIC CONTROL DEVICE FOR AUTOMATIC TRANSMISSION FOR VEHICLE HAVING CLUTCH OPERABLE IN TWO SPEED STAGES AND TWO PARALLEL HYDRAULIC PRESSURE SUPPLY PASSAGES THEREFOR

BACKGROUND OF THE INVENTION

1. Field of the Invention

The present invention relates to a hydraulic control device for an automatic transmission for a vehicle such as an automobile, and more particularly, to a hydraulic control device for an automatic transmission for a vehicle such as an automobile including a speed stage shifting device having a hydraulically operated friction engaging means such as a clutch adapted to be engaged when a first speed stage and a second speed stage are set up and disengaged when a third speed stage is set up, the engagement of said friction engaging means being essential for setting up said first speed stage while the engagement of said friction engaging means is not essential for setting up said second speed stage unless engine brake availability is required.

2. Description of the Prior Art

In Japanese Patent Application 62-195471 filed on Aug. 5, 1987 and laid open to public on Feb. 13, 1989, two of the inventors of the present invention have proposed an automatic transmission for a vehicle such as an automobile in which the speed stage shifting device has a hydraulically operated friction engaging means such as described above.

In more detail, in an embodiment of the automatic transmission proposed by the above-mentioned Japanese patent application, as shown in Table 1 and FIG. 2 of the present application, a first clutch $C_1$ is engaged when the so-called 1st speed stage, 2nd speed stage and 3rd speed stage are set up and is disengaged when the 4th speed stage is set up. In the 2nd speed stage it is essential that the clutch $C_1$ is engaged, but in the 3rd speed stage it is not essential that the clutch C1 is engaged unless engine brake availability is required since a one way clutch $F_1$ is provided in parallel with the clutch $C_1$. Therefore, in setting up the 2nd speed stage, particularly in downshifting to the 2nd speed stage from the 4th speed stage in which the clutch $C_1$ is disengaged, it is necessary that the clutch $C_1$ is relatively quickly engaged, while in setting up the 3rd speed stage, including in downshifting from the 4th speed stage in which the clutch $C_1$ is disengaged, it is not necessary that the clutch $C_1$ is quickly engaged or rather it is desirable that the clutch $C_1$ is engaged with a substantial delay so as not to cause any temporary engine braking to occur.

SUMMARY OF THE INVENTION

In view of the above-mentioned requirements, it is the primary object of the present invention to provide a hydraulic control device for an automatic transmission for a vehicle such as an automobile in which a certain hydraulically operated friction engaging means such as the above-mentioned clutch $C_1$ is engaged when a first one of the speed stages and a second one of the speed stages are set up and is disengaged when a third one of the speed stages is set up, the engagement of said friction engaging means being essential for setting up said first one of the speed stages while the engagement of said friction engaging means is not essential for setting up said second one of the speed stages unless engine brake availability is required, so as to have a performance of supplying a hydraulic pressure to said friction engaging means relatively quickly when said first one of the speed stages is set up on the one hand while on the other hand supplying a hydraulic pressure to the same friction engaging means relatively slowly when said second one of the speed stages is set up.

The above-mentioned primary object of the present invention is accomplished, according to the present invention, by a hydraulic control device for an automatic transmission for a vehicle such as an automobile including a speed stage shifting device having a hydraulically operated friction engaging means such as a clutch adapted to be engaged when a first one of the speed stages and a second one of the speed stages are set up and disengaged when a third one of the speed stages is set up, the engagement of said friction engaging means being essential for setting up said first one of the speed stage while the engagement of said friction engaging means is not essential for setting up said second one of the speed stages unless engine brake availability is required, comprising a first and a second passage for supplying a hydraulic pressure to said friction engaging means in parallel with one another, said first passage having a substantially less fluid flow resistance than said second passage, and a fluid flow switching over means for alternatively communicating said first passage while interrupting said second passage or communicating said second passage while interrupting said first passage according to whether said first one of the speed stages or said second speed stages is set up.

In order that said second passage provides a substantial delay in supplying the hydraulic pressure to said friction engaging means, the hydraulic control device of the above-mentioned construction may further include an accumulator at a part of said second passage. In such a construction said second passage should also include a one way valve at a part thereof extending between said friction engaging means and said accumulator for allowing fluid to flow only in one direction toward said friction engaging means.

However, when said clutch is further engaged to provide another speed stages lower than said first one of the speed stages with an operation of such an accumulator, in an abrupt downshifting from said third one of the speed stage to said another speed stage the engagement of said clutch would be delayed by the operation of the accumulator.

Therefore, it is another object of the present invention to provide a hydraulic control device for an automatic transmission for a vehicle which accomplishes the above-mentioned primary object and further can engage said clutch quickly in an abrupt downshifting from said third one of the speed stages to said another speed stage lower than said first one of the speed stages through a short stay at said first one of the speed stages.

The above-mentioned additional object is accomplished, according to an additional feature of the present invention, by said first passage being connected via a throttled passage with a part of said second passage located on the upstream side of said one way valve.

BRIEF DESCRIPTION OF THE DRAWINGS

In the accompanying drawings,

FIG. 2 is a table showing combinations of energization of the solenoid valves and engagement of the clutches and brakes for setting up respective speed stages;

FIGS. 3a, 3b, 3c are a diagram showing an embodiment of a hydraulic control device for an automatic transmission for a vehicle in a part of which the hydraulic control device according to the present invention is incorporated;

DESCRIPTION OF THE PREFERRED EMBODIMENTS

In the following the invention will be described in detail with respect to some preferred embodiments thereof with reference to the accompanying drawings.

Figure 1:
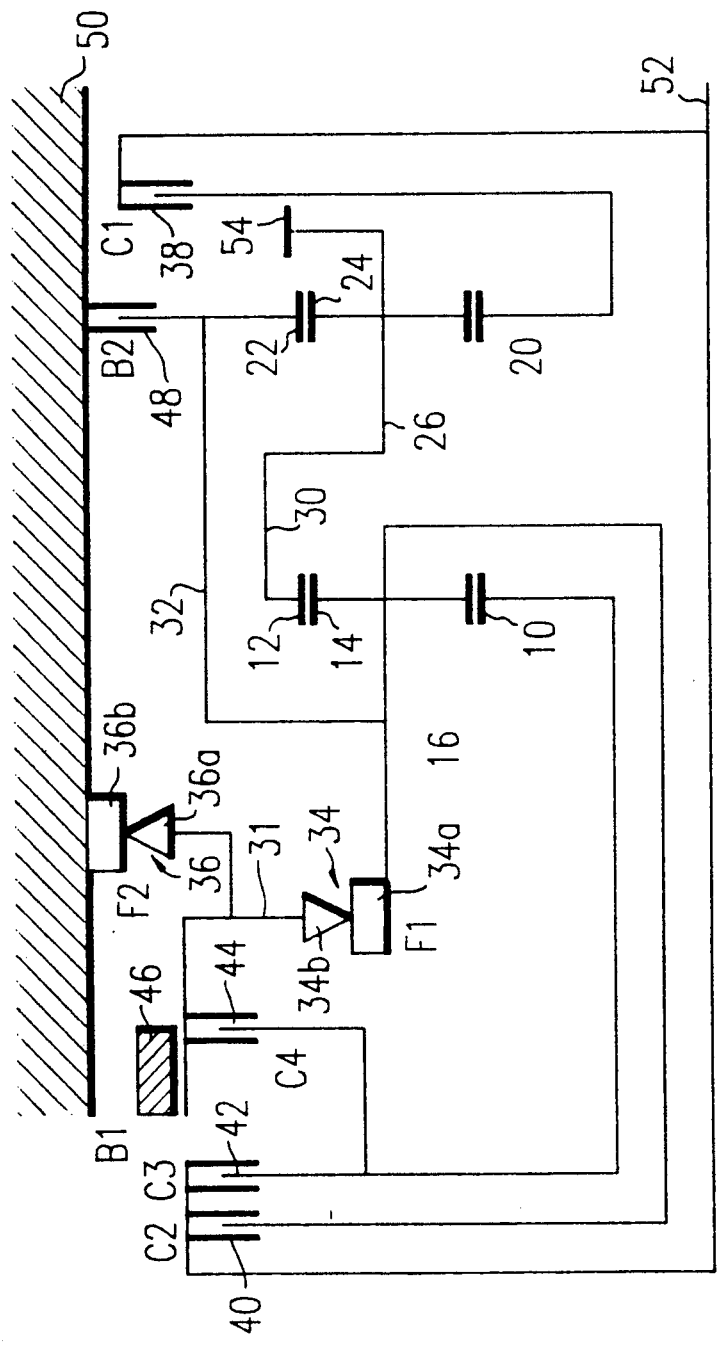
FIG. 1 is a schematic illustration of a planetary gear type speed change device for an automatic transmission having substantially the same speed stage shifting device as that disclosed in the above-mentioned Japanese patent application to which the hydraulic control device according to the present invention is applicable.

Referring to FIG. 1, the speed stage shifting mechanism herein shown comprises a first planetary gear mechanism having a first sun gear 10, a first ring gear 12 coaxial with said first sun gear 10, a first planetary pinion 14 meshing with said first sun gear 10 and said first ring gear 12, and a first carrier 16 rotatably supporting said first planetary pinion 14, and a second planetary gear mechanism having a second sun gear 20, a second ring gear 22 coaxial with said second sun gear 20, a second planetary pinion 24 meshing with said second sun gear 20 and said second ring gear 22, and a second carrier 26 rotatably supporting said second planetary pinion 24. The first ring gear 12 is connected with the second carrier 26 by a connecting member 30. The first carrier 16 is connected with the second ring gear 22 by a connecting member 32.

A first one way clutch 34 and a second one way clutch 36 are provided in series between a housing 50 and the first carrier 16 which is also connected with the second ring gear 22 by the connecting member 32. The first one way clutch 34 is closer to the first carrier 16 and the second one way clutch 36 is closer to the housing 50. In more detail, the first one way clutch 34 has an inner race 34a connected with the first carrier 16 and an outer race 34b connected via a connecting member 31 with an inner race 36a of the second one way clutch 36 which also has an outer race 36b connected with the housing 50. The first one way clutch 34 is engaged when the outer race 34b would rotate relative to the inner race 34a in in a first rotational direction and slips when the inner race 34a rotates relative to the outer race 34b in a second direction opposite to said first direction. Similarly, the second one way clutch 36 is engaged when the inner race 36a would rotate relative to the outer race 36b in said first direction and slips when the inner race 36a rotates relative to the outer race 36a in said second direction.

The second carrier 26 is connected with an annular gear member 54 which operates as an output rotational member of this speed stage shifting mechanism.

A first clutch 38 is provided between the second sun gear 20 and an input shaft 52 for selectively connecting these two members with one another. A second clutch 40 is provided between the first carrier 16 and the input shaft 52 for selectively connecting these two members with one another. A third clutch 42 is provided between the first sun gear 10 and the input shaft 52 for selectively connecting these two members with one another. A fourth clutch 44 is provided between the first sun gear 10 and the connecting member 31 for selectively connecting the sun gear 10 with the outer race 34b of the one way clutch 34 and the inner race 36b of the one way clutch 36.

A first brake 46 is provided between the connecting member 31 and the housing 50 for selectively fixing the connecting member 31 relative to the housing 50. A second brake 48 is provided between the combination of the second ring gear 22 and the first carrier 16 and the housing 50 for selectively fixing the second ring gear 22 and the first carrier 16 with respect to the housing 50.

The manner of providing the 1st speed stage, the 2nd speed stage, the 3rd speed stage (direct connection stage), the 4th speed stage (overdrive stage) and the reverse stage is shown in Table 1 and FIG. 2. In Table 1 and FIG. 2 a circle (O) indicates that the corresponding clutch, brake or one way clutch is engaged in engine drive state, and in Table 1 a circle in parentheses ((O)) indicates that the corresponding clutch or brake is engaged to provide the corresponding speed stage with the effect of engine braking.

When the ratio of the number of gear teeth of the first ring gear 12 to that of the first sun gear 10 is $r_1$, and the ratio of the number of gear teeth of the second ring gear 22 to that of the second sun gear 20 is $r_2$, speed change gear ratios at the respective speed stages are as shown in Table 2.

Figure 3B:
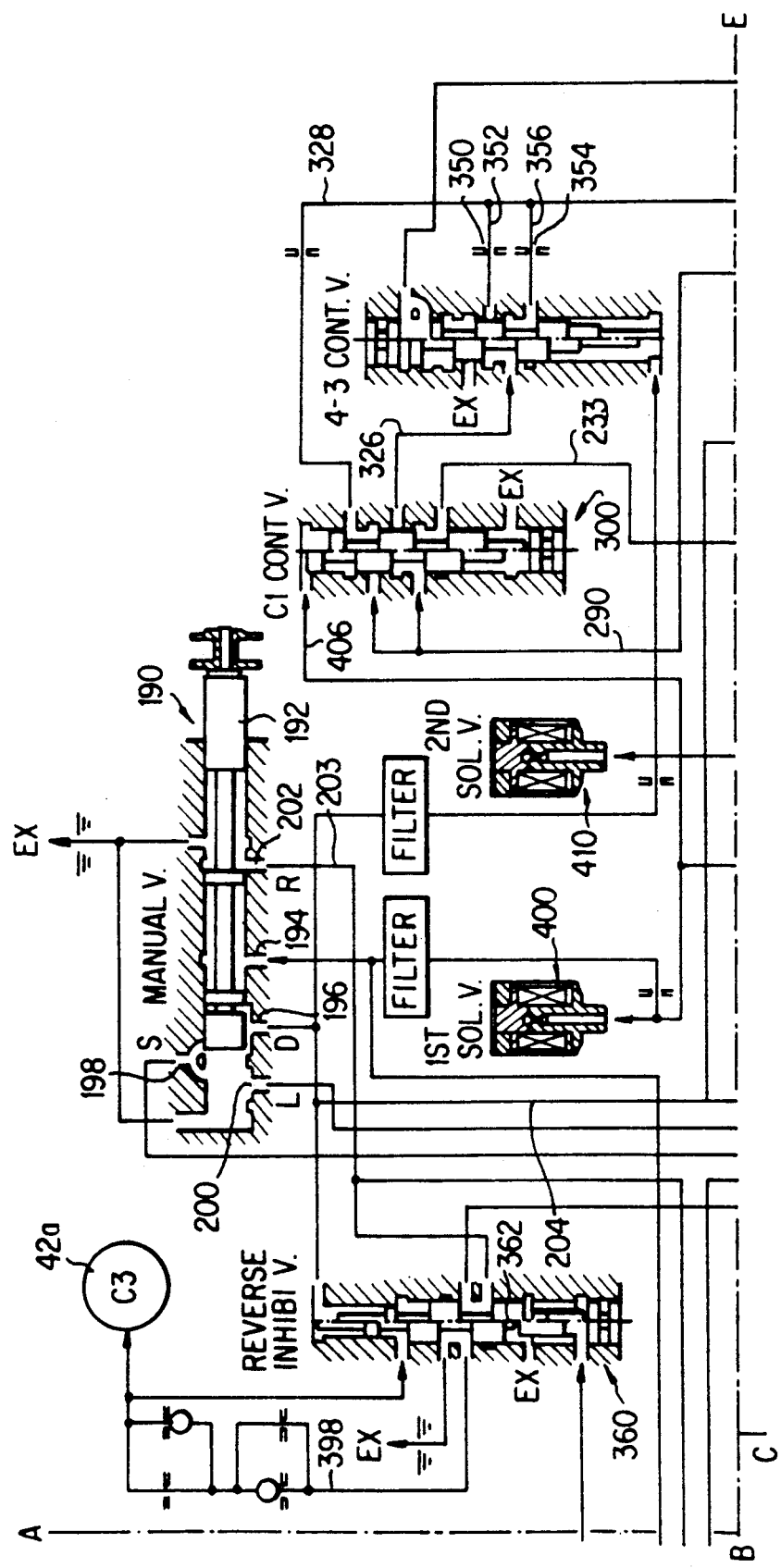
Figure 3C:
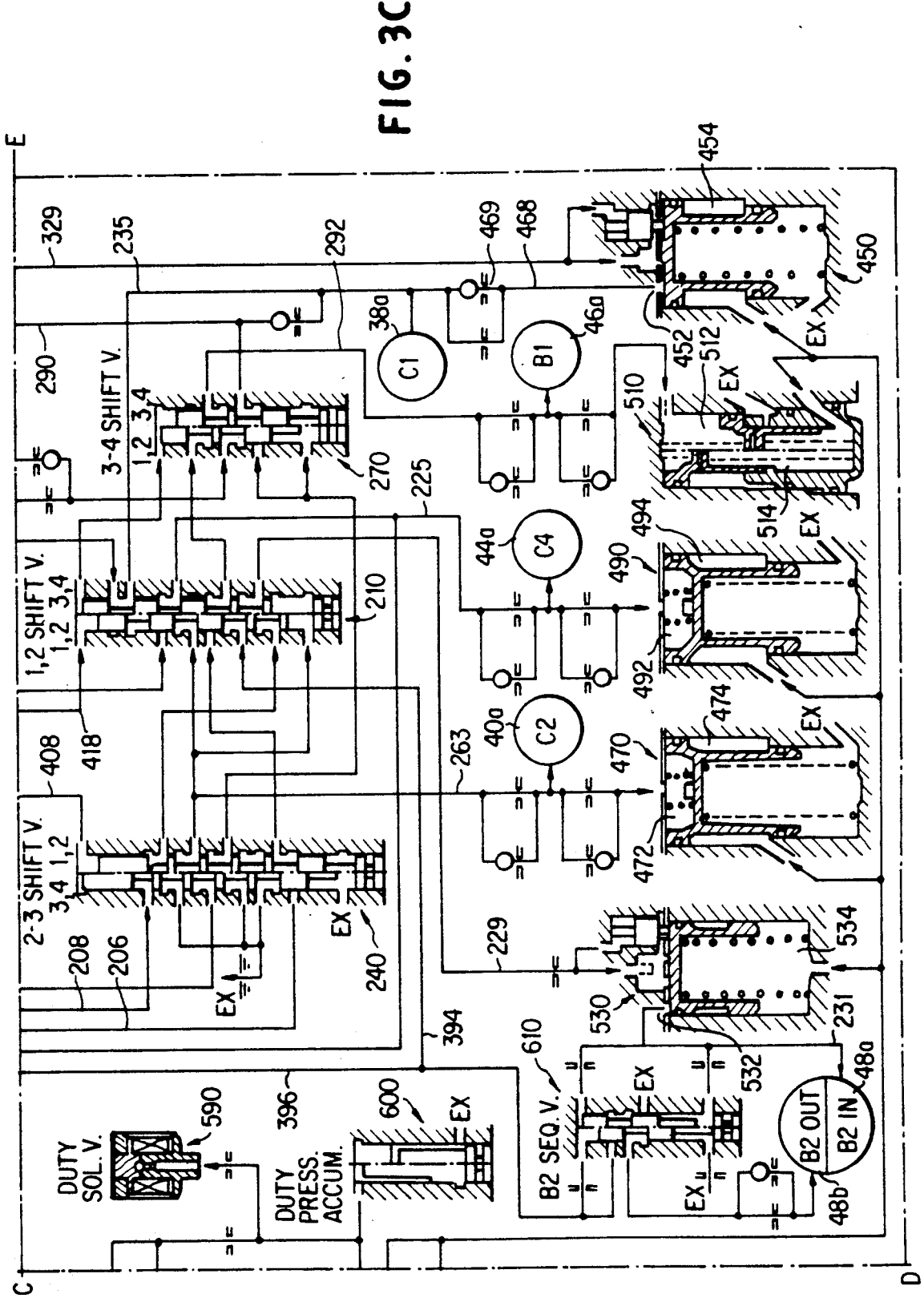

The first clutch 38, the second clutch 40, the third clutch 42, the fourth clutch 44, the first brake 46 and the second brake 48 are all of a hydraulically operating type having, as shown in FIG. 3, hydraulic pressure chambers 38a, 40a, 42a, 44a, 46a and 48a plus 48b, respectively, and are adapted to be engaged when a hydraulic pressure is supplied to the hydraulic pressure chambers and are disengaged when the hydraulic pressure has been exhausted from the hydraulic pressure chambers. The supply and the exhaust of the hydraulic pressure to and from these hydraulic pressure chambers are carried out by a hydraulic control device such as shown in FIG. 3.

The input shaft 52 of the above-mentioned planetary gear type speed change device is drivingly connected with a motor such as an internal combustion engine not shown in the figure via a fluid torque converter 60 such as shown in FIG. 3.

The fluid torque converter 60 is of a three elements two phases type comprising a pump impeller 62 drivingly connected with an output member of the motor, a turbine rotor 64 drivingly connected with the input shaft 52 of the planetary gear type speed stage shifting mechanism, and a stator 66 rotatable only in one direction. The fluid torque converter 60 further comprises a lock-up clutch 68 which is engaged to connect the pump impeller 62 directly with the turbine rotor 64 when a hydraulic pressure is supplied to its port 60a and is disengaged when a hydraulic pressure is supplied to its port 60b. The supply of hydraulic pressure to the ports 60a and 60b is carried out by the hydraulic control device shown in FIG. 3.

The hydraulic control device for the automatic transmission for a vehicle according to the present invention will now be described with reference to FIGS. 3-5 with some descriptions about the related basic constructions supporting the essential constructions of the present invention.

The hydraulic control device comprises a pump 70 which takes in an oil from a reservoir not shown in the figure and supplies the oil to a primary regulator valve 80 which is generally called a line pressure control valve and generates a line pressure and also to a throttle valve 120. The maximum value of the hydraulic pressure supplied by the pump 70 to the primary regulator valve 80 is restricted by a pressure relief valve 72.

The throttle valve 120 provides a hydraulic pressure which varies in accordance with the load on the engine and is generally called a throttle pressure in a passage 138.

The primary regulator valve 80 is supplied with the throttle pressure and a reverse boost pressure and provides the line hydraulic pressure which generally increases in accordance with increase of the throttle opening in a passage 98 and a hydraulic pressure for a secondary regulator valve 100 generally called a converter pressure control valve.

The secondary regulator valve 100 is supplied with the throttle pressure and provides a converter pressure (lubricating oil pressure) in a passage 118. The line pressure in the passage 98 is supplied to a port 194 of a manual valve 190. The manual valve 190 has a spool element 192 adapted to be operated by a hand of a driver and selectively provides the line pressure supplied to the port 194 at a D port 196 in the so-called D range, at an S port 198 in the S or 2 range at an L port 200 in the L range, and at an R port 202 in the R range.

The line pressure supplied to the D port 196 is conducted through a passage 204 to a D port 214 of a 1-2 shift valve 210, a D port 246 of a 2-3 shift valve 240, and a D port 274 of a 3-4 shift valve 270. The line pressure supplied to the S port 198 is conducted through a passage 206 to an S port 248 of the 2-3 shift valve 240. The line pressure supplied to the L port 200 is conducted through a passage 208 to an L port 250 of the 2-3 shift valve 240. The line pressure supplied to the R port 202 is conducted through a passage 203 to a reverse inhibition valve 360.

Figure 4:
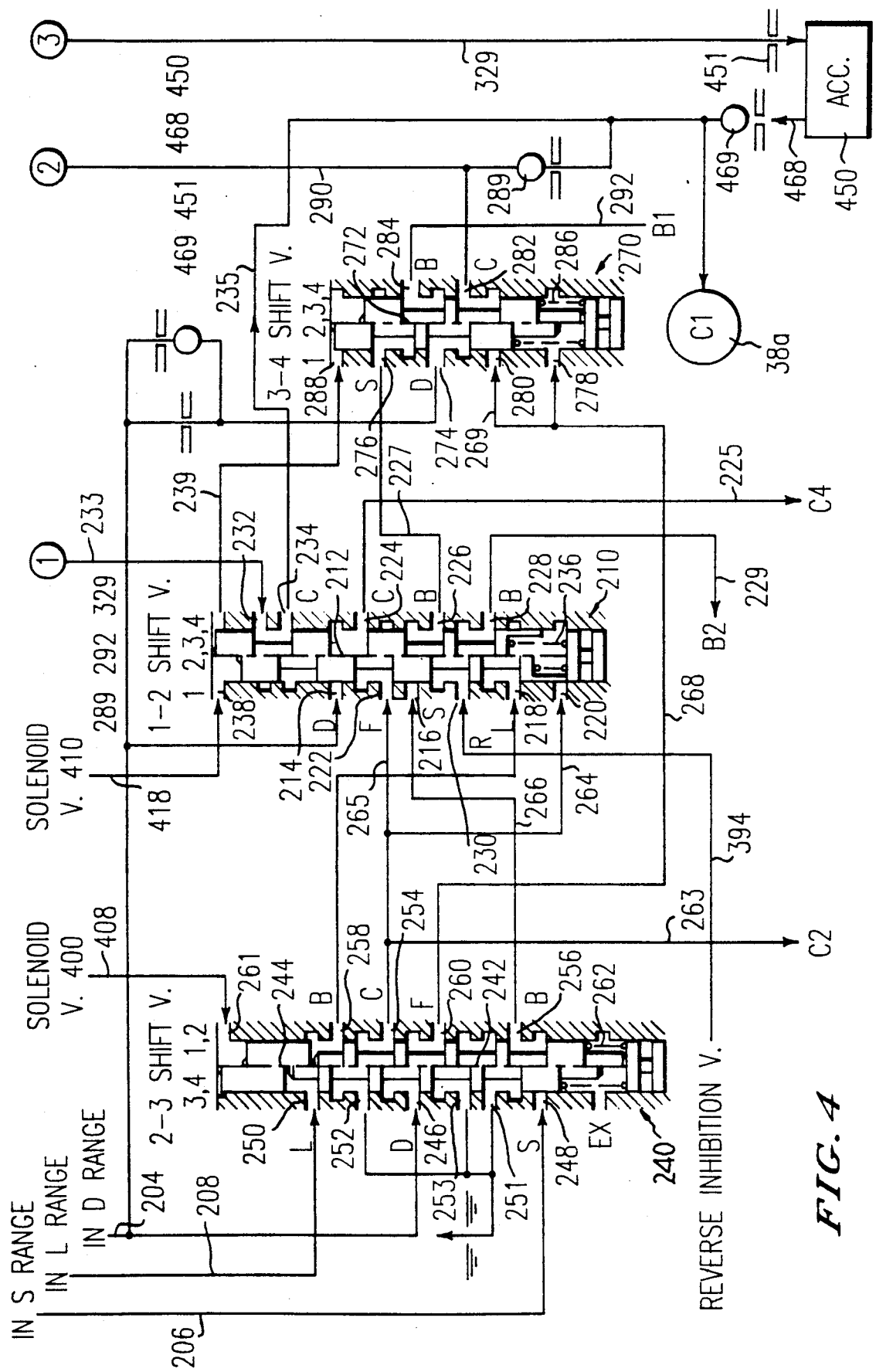
FIGS. 4 and 5 are diagrams of an essential portion of the hydraulic control device according to the present invention.

As shown in FIG. 4 the 2-3 shift valve 240 comprises a spool element 242 and a plug element 244, and in addition to the above-mentioned ports further comprises drain ports 251, 252 and 253, a clutch port 254, brake ports 256 and 258 and a fail safe port 260. When a hydraulic pressure is supplied to a control port 261, the plug element 244 and the spool element 242 are shifted downward in the figure to a shift position as shown in the right half portion thereof by overcoming the spring force of a compression coil spring 262 so as to connect the clutch port 254 with the drain port 252, the brake port 256 with the S port 248, the brake port 258 with the L port 250, and the fail safe port 260 with the D port 246, respectively. In contrast, when no hydraulic pressure is supplied to the control port 261, the plug element 244 and the spool element 242 are shifted upward in the figure to a shift position as shown in the left half portion thereof by the spring force of the compressing coil spring 262 so as to connect the clutch port 254 with the D port 246, and the brake ports 256 and 258 and the fail safe port 260 with the drain ports 251, 252 and 252, respectively.

The supply of the hydraulic pressure to the control port 261 is controlled by a first solenoid valve 400.

The clutch port 254 is connected through a passage 263 with the hydraulic pressure chamber 40a of the second clutch 40 and an accumulator chamber 472 of an accumulator 470 for the clutch $C_2$. The clutch port 254 is also connected through a passage 264 with a hold port 220 of the 1-2 shift valve 210, and also through a passage 265 with a fail safe port (drain port) 222 of the 1-2 shift valve 210. The brake port 256 is connected through a passage 266 with the S port 216 of the 1-2 shift valve 210. The brake port 258 is connected through a passage 267 with the L port 218 of the 1-2 shift valve 210. The fail safe port 260 is connected through a passage 268 with a hold port 278 of the 3-4 shift valve 270 and also connected through a passage 269 with a drain port 280 of the 3-4 shift valve 270.

As also shown in FIG. 4, the 1-2 shift valve 210 comprises a spool element 212, and in addition to the above-mentioned ports further comprises a clutch port 224, brake ports 226 and 228, and R port 230, a port 232 and a clutch port 234. When a hydraulic pressure is supplied to a control port 238 the spool element 212 is shifted downward in the figure as shown in the left half portion thereof by overcoming the spring force of a compression coil spring 236 so as to connect the clutch port 224 with the fail safe port 222, the brake port 226 with the R port 230, and the brake port 228 with the L port 218, while isolating the port 232 from the clutch port 234. In contrast, when no hydraulic pressure is supplied to the control port 238, the spool element 212 is shifted upward as shown in the right half portion thereof by the spring force of the compression coil spring 236 so as to connect the clutch port 224 with the D port 214, the brake port 226 with the S port 216, the brake port 228 with the R port 230, and the port 232 with the clutch port 234.

The supply of the hydraulic pressure to the control port 238 is controlled by a second solenoid valve 410. The control port 238 is connected through a passage 239 with the control port 288 of the 3-4 shift valve 270.

The clutch port 224 is connected through a passage 225 with the hydraulic pressure chamber 44a of the fourth clutch 44 and an accumulator chamber 492 of an accumulator 490 for the clutch $C_4$. The brake port 226 is connected through a passage 227 with the S port 276 of the 3-4 shift valve 270. The brake port 228 is connected through a passage 229 with an accumulator chamber 532 of an accumulator 530 for the brake $B_2$, and is further connected through a passage 231 with the inside hydraulic pressure chamber 48a of the second brake 48. The port 232 is connected through a passage 233 with a port of a $C_1$ control valve 300. The clutch port 234 is connected through a passage 235 with the hydraulic chamber 38a of the first clutch 38.

Also referring to FIG. 4, the 3-4 shift valve 270 comprises a spool element 272, and in addition to the above-mentioned ports further comprises a clutch port 282 and a brake port 284. When no hydraulic pressure is supplied to the hold port 278 while a hydraulic pressure is supplied to the control port 288, the spool element 272 is shifted downward in the figure as shown in the right half portion thereof by overcoming the spring force of a compression coil spring 286 so as to connect the clutch port 282 with the drain port 280, and the brake port 284 with the D port 274. In contrast, when a hydraulic pressure is supplied to the hold port 278, or when no control pressure is supplied to the control port 288, the spool element 272 is shifted upward in the figure as shown in the left half portion thereof by the hydraulic pressure supplied to the port 278 and/or the spring force of the compression coil spring 286 so as to connect the clutch port 282 with the D port 274, and the brake port 284 with the S port 276.

The clutch port 282 is connected through a passage 290 with the $C_1$ control valve 300. The brake port 284 is connected through a passage 292 with the hydraulic pressure chamber 46a of the first brake 46 and an accumulator chamber 512 of an accumulator 510 for the brake $B_1$.

The first solenoid valve 400 and the second solenoid valve 410 are normally open type valves which open their ports when not energized and close their ports when energized. The manner of energization of these solenoid valves is shown in FIG. 2 in relation with the speed stages to be set up. In FIG. 2 a circle (O) indicates energization of the corresponding solenoid valve.

The first solenoid valve 400 is connected through a passage 408 with the control port 261 of the 2-3 shift valve 240 and is also connected through a passage 406 with a port of the C1 control valve 300.

The second solenoid valve 410 is connected through a passage 418 with the control port 238 of the 1-2 shift valve 210 and further through the passage 239 with the control port 288 of the 3-4 shift valve 270, and still further through a passage 416 with the hold port 340 of the 4-3 control valve 330, so as to supply a hydraulic pressure to the control port 238 and 288 and the hold port 340 when it is energized.

The $C_1$ control valve 300 is a clutch control valve for controlling the engaging speed of the first clutch 38. In more detail, as shown in FIG. 5, the $C_1$ control valve 300 has a spool element 302 adapted to be shifted between an upper shift position as shown in a left half portion thereof in the figure under the spring force of a compression coil spring 316 when no hydraulic pressure is supplied to a control port 314 so as to interrupt connection between ports 304 and 308 and connection between ports 306 and 312 while connecting the port 306 with a port 310 and a lower shift position as shown in the right half portion thereof in the figure against the spring force of the compression coil spring 316 when the control port 314 is supplied with a hydraulic pressure so as to connect the port 304 with the port 308 and the port 306 with the port 312.

As described above, the port 312 is connected through the passage 233 with the port 232 of the 1-2 shift valve 210, while the port 308 is connected through a passage 328 throttled at a part thereof by an orifice 327, a passage 329 and an orifice 451 with an accumulator chamber 452 of an accumulator 450 for the clutch $C_1$, and further through a passage 468 and a one way valve 469 with the hydraulic pressure chamber 38a of the first clutch 38. The port 310 is connected through a passage 324 throttled at a part thereof by an orifice 325 with the passage 329, and is also connected through a passage 326 with a port 334 of a 4-3 control valve 330.

Figures 5, 6:
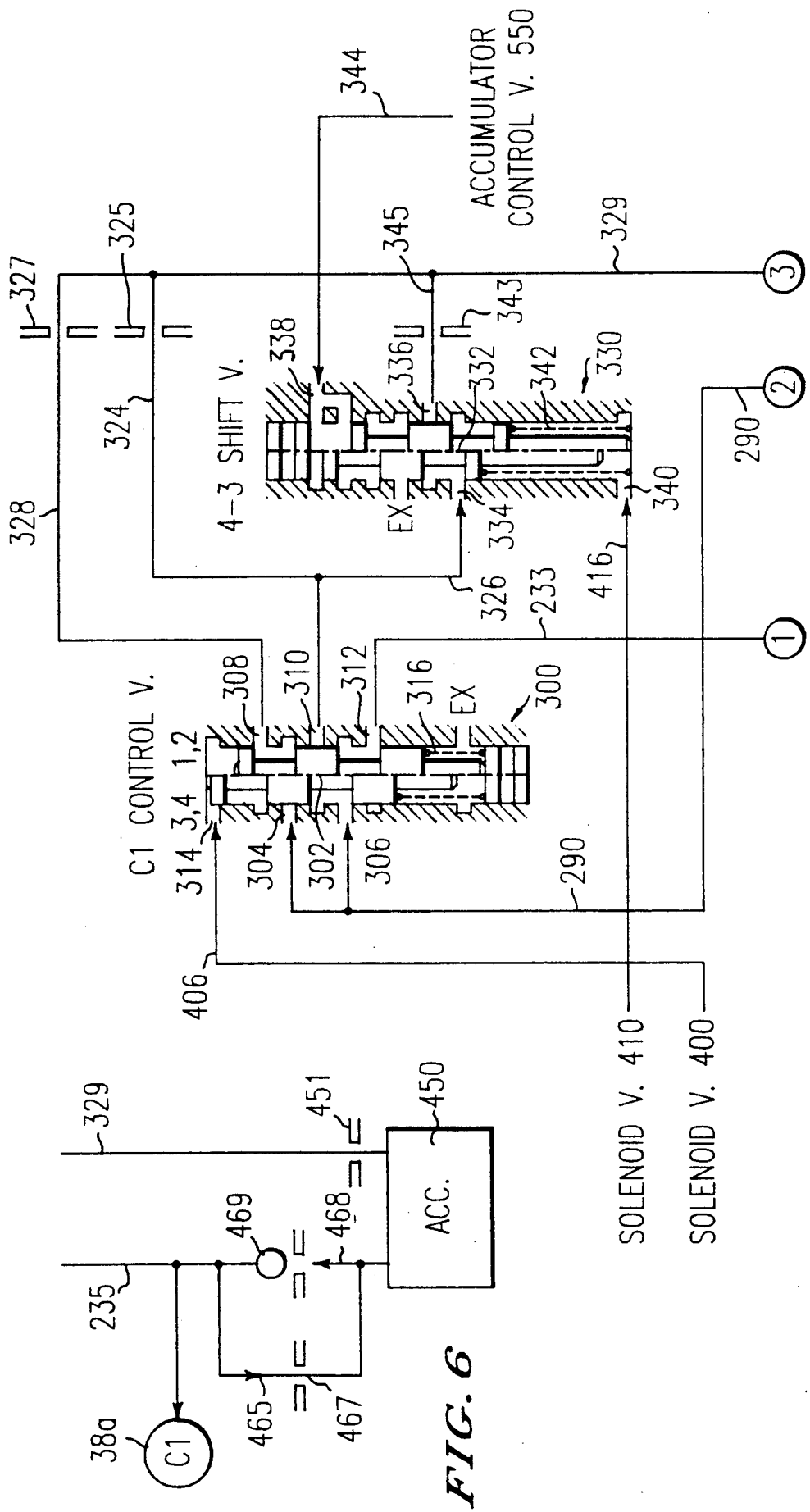
FIG. 6 is a partial diagram corresponding to a part of the diagram shown in FIG. 4, showing a modification according to another embodiment of the present invention.

The 4-3 control valve 330 has, as shown in FIG. 5, a spool element 332 adapted to be movable between an upper position shown in a left half portion thereof in the figure when a hold port 340 is supplied with a hydraulic pressure and/or no hydraulic pressure is supplied at a control port 338 by the spring force of a compression coil spring 342 and a lower position as shown in a right half portion thereof in the figure against the spring force of the compression coil spring 342 when the control port 338 is supplied with a hydraulic pressure so as to interrupt connection between ports 334 and 336. When the spool element 332 is in the upper position as shown in the left half portion thereof in the figure, the port 334 is connected with the port 336. The control port 338 is connected through a passage 344 with a first accumulator control valve 550 so as to be supplied with a first accumulator control pressure which varies in accordance with the throttle opening. The port 336 is connected through a passage 345 having an orifice 343 with the passage 329. The throttling ratio of the orifice 343 is less than that of the orifice 325.

The hydraulic pressure chamber 38a of the first clutch 38 is connected with the clutch port 282 of the 3-4 shift valve 270 through a one way valve 289 to be quickly exhausted of the hydraulic pressure therefrom.

The reverse inhibition valve 360 is supplied with the line pressure from the R port 202 of the manual valve 190 through the passage 203, and is switched over according to opening or closing of the third solenoid valve 420 so as to be at an inhibit position where a spool 362 is shifted up as shown in a left half portion thereof when the vehicle is running forward at a speed greater than a predetermined value and to be in a non inhibit position where the spool element 362 is shifted down as shown in the right half portion thereof during other operating conditions while allowing the line pressure from the passage 203 to flow to the passage 398 toward the hydraulic pressure chamber 42a of the third clutch 42, to the passages 396 and 394 toward the R port 230 of the 1-2 shift valve 210, and also to the passage 396, a $B_2$ sequence valve 610 and the passage 392 toward the outside hydraulic pressure chamber 48b of the second brake 48.

The $B_2$ sequence valve 610 operates in response to the hydraulic pressure in the inside hydraulic pressure chamber 48a of the second brake 48 so as to connect the passage 396 with the passage 392 so that the outside hydraulic pressure chamber 48b is supplied with the hydraulic pressure when the hydraulic pressure in the inside hydraulic pressure chamber 48a is greater than a predetermined value.

Accumulators 450, 470, 490, 510 and 530 are back pressure control type accumulators having back pressure chambers 454, 474, 494, 514 and 534, respectively. The hydraulic pressure supplied to these back pressure chambers is controlled by a second accumulator control valve 560.

The second accumulator control valve 560 is supplied with a duty hydraulic pressure controlled by a duty solenoid valve 590 and the hydraulic pressure from the first accumulator control valve 550 to change its output control pressure.

The duty solenoid valve 590 is supplied with a pulse signal having a determinate duty ratio and cyclically opens and closes according to the duty ratio so as to control a modulate hydraulic pressure from a duty control valve 580 according to the duty ratio. The duty hydraulic pressure controlled by the duty solenoid valve 590 for the second accumulator control valve 560 is rectified of its pulses by a duty pressure accumulator 600.

The first accumulator control valve 550 is supplied with the throttle pressure from the throttle valve 138 so as to control the hydraulic pressure supplied to the second accumulator control valve 560 and the 4-3 control valve 330 in accordance with the throttle pressure.

The supply of the converter pressure to the ports 60a and 60b of the fluid torque converter 60 is controlled by a lock up relay valve 140.

The lock up relay valve 140 is switched over according to a selective supply of a hydraulic pressure from a lock up signal valve 160. The lock up relay valve 140 supplies oil toward an oil cooler 170. The hydraulic pressure in the passage including the oil cooler 170 is limited by a cooler by-pass valve 172 and a relief valve 174.

The lock up signal valve 160 is supplied with a hydraulic pressure from the clutch port 224 of the 1-2 shift valve 210 and is switched over in accordance with on and off of the third solenoid valve 420 so as to supply the hydraulic pressure supplied from the clutch port 224 to the lock up relay valve 140 and to engage the lock up clutch 68 when the third solenoid valve 420 is energized.

The third solenoid valve 420 is selectively energized as shown in FIG. 2 for inhibiting engagement of the lock up clutch 68 in the reverse stage when the manual shift valve is shifted to the R range and when the manual shift valve is sifted to the D range.

The operation of the hydraulic control device according to the present invention will now be described principally with respect to the speed change operation in the D range.

First, the operation in the 1st speed stage will be described. In the 1st speed stage the first solenoid valve 400 and the second solenoid valve 410 are both energized, and therefore the control port 261 of the 2-3 shift valve 240, the control port 238 of the 1-2 shift valve 210 and the control port 288 of the 3-4 shift valve 270 are supplied with the hydraulic pressure. Therefore, the plug element 244 and the spool element 242 of the 2-3 shift valve 240 are shifted to the shift position shown in the right half portion thereof, and the spool element 212 of the 1-2 shift valve 210 is shifted to the shift position shown in the left half portion thereof. Therefore, the line pressure from the D port 196 of the manual shift valve 190 is supplied through the passage 204, the D port 246 of the 2-3 shift valve 240, the fail safe port 260, and the passage 268 to the hold port 278 of the 3-4 shift valve 270. The 3-4 shift valve 270 is supplied with the hydraulic pressure at the control port 288. However, since the hold port 278 is also supplied with the hydraulic pressure, the spool element 272 is shifted to the ascended shift position shown in the left half portion thereof by the spring force of the compression coil spring 286.

Thus the D port 274 is connected with the clutch port 282, and therefore the line hydraulic pressure supplied from the D port 196 of the manual shift valve 190 is supplied through the passage 290 to the port 304 and 306 of the $C_1$ control valve 300. Since at this time the control valve 314 of the $C_1$ control port 300 is supplied with the hydraulic pressure, the spool element 302 of the $C_1$ control valve 300 is positioned in the lowered position as shown in the right half portion thereof in the figure, connecting the port 304 with the port 308 and the port 306 with the port 312, and therefore the hydraulic pressure supplied to the port 304 and 306 is conducted through the passages 328 and 233. At this time the spool element 212 of the 1-2 shift valve 210 is shifted to the lowered shift position as shown in the left half portion thereof in the figure, with the port 232 being obstructed, so that the hydraulic pressure is conducted through the passage 328 and the orifice 327 to the passage 329, and then through the orifice 451, the accumulator chamber of the accumulator 450 for the $C_1$ clutch, the passage 468, the one way valve 469 to the hydraulic pressure chamber 38a of the first clutch 38 to engage it. Since the throttling ratio of the orifice 327 is smaller than that of the orifices 325 and 343, the supply of the hydraulic pressure to the pressure chamber 38a is carried out relatively quickly, so that the first clutch 38 is relatively quickly engaged to set up the 1st speed stage in the D range.

Next, the 2nd speed stage will be described. In this speed stage the first solenoid valve 400 is only energized, so that the control port 261 of the 2-3 shift valve 240 only is still supplied with the hydraulic pressure. Therefore, the plug element 244 and the spool element 242 of the 2-3 shift valve 240 remains in the descended shift position, whereas the spool element 212 of the 1-2 shift valve 210 is shifted to the ascended shift position shown in the right half portion thereof by the spring force of the compression coil spring 236. In the 3-4 shift valve 270 the hydraulic pressure in the control port 288 disappears and the spool element 272 still remains at the ascended shift portion shown in the left half portion thereof by the hydraulic pressure supplied to the hold port 278 and the spring force of the compression coil spring 286. By the shifting over of the 1-2 shift valve 210 the D port 214 is now connected with the clutch port 224 so that the line pressure from the D port 196 of the manual shift valve 190 is supplied to the passage 225 to the hydraulic pressure chamber 44a of the fourth clutch 44 which is then engaged. Thus the first clutch 38 and the fourth clutch 44 are engaged, thereby setting up the 2nd speed stage of the D range.

In this stage, by the shifting of the spool element 212 of the 1-2 shift valve 210 the port 232 is connected with the clutch port 234, and the hydraulic pressure from the port 312 is conducted through the passage 235 directly to the hydraulic pressure chamber 38a of the first clutch 38. However, since the hydraulic pressure chamber 38a has already been supplied with the hydraulic pressure of the same pressure level as the above-mentioned hydraulic pressure, the engaging condition of the first clutch 38 does not change.

Next, the 3rd speed stage will be described. In this speed stage the first solenoid valve 400 and the second solenoid valve 410 are both not energized, so that the control port 238 of the 1-2 shift valve 210 and the control port 261 of the 2-3 shift valve 240 are both not supplied with hydraulic pressure. Therefore, the plug element 244 and the spool element 242 of the 2-3 shift valve 240 are lifted to the ascended shift position as shown in the left half portion in the figure by the spring force of the compression coil spring 262, whereby the D port 246 of the 2-3 shift valve 240 is isolated from the fail safe port 260 thereof and is connected with the clutch port 254. Thus the line pressure from the D port 196 of the manual shift valve 190 is conducted through the passage 263 to the hydraulic pressure chamber 40a of the second clutch 40 which is then engaged. In the 3-4 shift valve 270, although the hold port 278 is no longer supplied with the hydraulic pressure, the spool element 272 still remains in the lifted shift position by the spring force of the compression coil spring 286. In the 1-2 shift valve 210, the spool element 212 remains in the lifted shift position as in the 2nd speed stage. Therefore, in addition to the first clutch 38 and the fourth clutch 44 the second clutch 40 is now engaged, thereby setting up the 3rd speed stage of the D range.

In the 3rd speed stage the spool element 302 of the $C_1$ control valve 300 is positioned in its ascended position as shown in the left half portion thereof in the figure under no energization of the first solenoid valve 400, so that the ports 304 and 312 are closed while only the port 306 is connected with the port 310. Therefore the hydraulic supply passage to the first clutch 38 is switched over. However, since the pressure level of the hydraulic pressure supplied to the hydraulic pressure chamber 38a is the same, the engaging condition of the first clutch 38 does not change.

Next, the 4th speed stage will be described. In this speed stage the second solenoid valve 410 only is energized. Therefore, the control port 238 of the 1-2 shift valve 210 and the control port 288 of the 3-4 shift valve 270 are supplied with the hydraulic pressure. In the 1-2 shift valve 210 the hold port 220 is supplied with the hydraulic pressure from the clutch port 254 of the 2-3 shift valve 240 through the passage 264. Therefore, in spite of the supply of the hydraulic pressure to the control port 238 the spool element 212 remains in the lifted shift position shown in the right half portion thereof by the spring force of the compression coil spring 236. However, in the 3-4 shift valve 270, since the hold port 278 is connected through the passage 268 and the fail safe port 260 of the 2-3 shift valve 240 to the drain port 253, the spool element 272 is shifted downward in the figure by the hydraulic pressure supplied to the control port 288 by overcoming the spring force of the compression coil spring 286. Therefore, the D port 274 is connected with the brake port 284 instead of the clutch port 282 which is now connected to the drain port through the port 280. Thus the hydraulic pressure chamber 38a of the first clutch 38 is now exhausted of the hydraulic pressure, and the first clutch 38 is disengaged. Instead the line pressure is supplied to the hydraulic pressure chamber 46a of the first brake 46 which is now engaged. Therefore, the second clutch 40, the fourth clutch 44 and the first brake 46 are engaged, thereby setting up the overdrive 4th speed stage of the D range.

When the transmission is shifted down from the 4th speed stage to the 3rd speed stage under engine driving, that is a kick down from the 4th speed stage to the third speed stage, the spool element 302 of the $C_1$ control valve 300 is positioned at its ascended position as shown in the left half portion thereof in the figure, and therefore the port 306 only is connected with the port 310, so that the hydraulic pressure from the clutch port 282 of the 3-4 shift valve 270 is supplied through the passage 290, the ports 306 and 310 to the passages 324 and 326. In the downshifting under engine driving the throttle opening is relatively high. Therefore, the first accumulator hydraulic pressure generated by the first accumulator control valve 550 is relatively high, and therefore the spool element 332 of the 4-3 control valve 330 applied with this relatively high first accumulator hydraulic pressure at the control port 338 is at the descended position as shown in the right half portion thereof in the figure against the spring force of the compression coil spring 342. Therefore, the port 334 is interrupted from the port 336, and therefore the hydraulic pressure from the port 310 is conducted only through the passage 324 having the throttling orifice 325 to the passage 329. Then the hydraulic pressure is conducted through the throttling orifice 451, the accumulator chamber of the accumulator 450 for the $C_1$ clutch, the passage 468 and the one way valve 469 to the hydraulic pressure chamber 38a of the first clutch 38. In this state, therefore, the first clutch 38 is engaged relatively slowly according to the throttling ratios of the orifices 325 and 451 and the accumulator characteristic of the accumulator 450. Thus it is avoided that in the downshifting from the 4th speed stage to the 3rd speed stage the first clutch 38 is substantially engaged before the one way clutch 34 is engaged as a result of a rising up of the input power rotational speed, so that the speed stage shifting is completed with no large speed shifting shock to occur.

When the transmission is shifted from the 4th speed stage to the 3rd speed stage by the prohibition of the overdrive stage such as putting off of the overdrive button, the first accumulator hydraulic pressure supplied to the control port 338 of the 4-3 control valve 330 is relatively low because the throttle opening is of the order of idling opening, and therefore the spool element 332 of the 4-3 control valve 330 is positioned at its ascended position as shown in the left half portion thereof in the figure under the spring force of the coil spring 342, with the port 334 being connected with the port 336. In this state the passage 329 is supplied with the hydraulic pressure also through the passage 345 in addition to the passage 324, and since the throttling ratio of the orifice 343 in the passage 345 is smaller than that of the orifice 325 in the passage 324, the speed of supplying the hydraulic pressure to the hydraulic pressure chamber 38a of the first clutch 38 is higher than in the case where the hydraulic pressure is supplied only through the passage 324 only, and therefore the first clutch 38 is put into engagement for a substantial torque transmitting capacity in an early stage as compared with the kick down from the 4th speed stage to the 3rd speed stage. In the downshifting due to the overdrive cutting the first one way clutch 34 will not be swiftly put into its engagement, and therefore if the engagement of the first clutch 38 were delayed, the vehicle would be put into an inertia running condition during the speed stage shifting as if running in the neutral shift position. However, by the first clutch 38 being quickly engaged as described above, the occurrence of such a inertial running condition is avoided and the engine braking effect is obtained with no delay.

In the kick down from the 4th speed stage to the 2nd speed stage the first solenoid valve 400 is energized so as to supply a hydraulic pressure to the control port 314 of the $C_1$ control valve 300, so that the spool element 302 is shifted to the descended position as shown in the right half portion thereof in the figure, thereby the port 304 being connected with the port 308 while the port 306 being connected with the port 312. In this state the spool element 212 of the 1-2 shift valve 210 is in the ascended position as shown in the right half portion thereof in the figure with the port 232 being connected with the clutch port 234, and therefore the hydraulic pressure from the port 312 of the $C_1$ control valve 300 is conducted through the passage 233, the port 232, the clutch port 234 and the passage 235 directly to the hydraulic pressure chamber 38a of the first clutch 38 while bypassing the accumulator, thus the first clutch being immediately engaged. Thus it is ensured that the first clutch 38 is engaged so as to provide a required substantial torque transmission before the second clutch 40 is completely disengaged, thereby avoiding an abnormal rising up of the engine rotational speed and thereby also ensuring a desirable speed stage shifting with no speed stage shifting shocks.

In the above-mentioned operation according to the hydraulic circuits shown in FIGS. 4 and 5, when the transmission is shifted down from the 4th speed stage to the 2nd speed stage, and then immediately further to the 1st speed stage, since the accumulator 450 has not been charged with the hydraulic pressure in the 4th speed stage, the supply of the hydraulic pressure to the clutch C1 for the 1st speed stage through the passage 329 and the accumulator 450 will delay the engagement of the clutch C1. Such a delay, however, can be effectively avoided by providing a passage 465 having a throttling orifice 467 so as to connect the accumulator 450 with the passage 235 while bypassing the one way valve 469, as shown in a partial diagram shown in FIG. 6 which corresponds to a part of the hydraulic circuit in FIG. 4 around the accumulator 450.

By providing such a bypass passage, when the speed stage is shifted down from the 4th speed stage to the 2nd speed stage and then immediately to the 1st speed stage, if there is only a short stay of the hydraulic circuit for the 2nd speed stage, that is, if there is a short time after the start of supply of the hydraulic pressure toward the clutch C1 through the passage 235 before the passage 235 is again interrupted by the shifting down of the spool element 212 of the 1-2 shift valve 210, the hydraulic pressure in the passage 235 will flow through the bypass passage 465 to the accumulator 450 to charge it at least partly, so as to decrease the delay of supply of hydraulic pressure to the clutch C1 which would occur in setting up the 1st speed stage by downshifting from the 4th speed stage to the 2nd speed stage and then to the 1st speed stage.

Although the invention has been described with respect to a particular embodiment thereof, it will be clear to those skilled in the art that the present invention is not limited to the shown embodiment and various embodiments are possible within the scope of the present invention.

TABLE 1

|  | $C_1$ 38 | $C_2$ 40 | $C_3$ 42 | $C_4$ 44 | $B_1$ 46 | $B_2$ 48 | $F_1$ 34 | $F_2$ 36 |
|---|---|---|---|---|---|---|---|---|
| 1st Speed Stage | 0 |  |  |  |  | (0) | 0 | 0 |
| 2nd Speed Stage | 0 |  |  | 0 | (0) |  |  | 0 |
| 3rd Speed Stage | 0 | 0 |  | 0 |  |  | 0 |  |
| 4th Speed Stage |  | 0 |  | 0 | 0 |  |  |  |
| Reverse Stage |  |  | 0 |  |  | 0 |  |  |

TABLE 2

|  | Speed Change Gear Ratio |
|---|---|
| 1st Speed Stage | $(1 + r_2)/r_2$ |
| 2nd Speed Stage | $\{(1 + r_2)/r_2\} - \{1/r_2(1 + r_1)\}$ |
| 3rd Speed Stage | 1 |

TABLE 2-continued

|  | Speed Change Gear Ratio |
|---|---|
| 4th Speed Stage | $1/(1 + r_1)$ |
| Reverse Stage | $-1/r_1$ |

We claim:
1. A hydraulic control device in an automatic transmission for a vehicle, the transmission including hydraulically operated friction engaging means for contributing to the setting up of speed stages of the transmission, the speed stages including a first one of said speed stages which is set up when at least the friction engaging means is engaged, a second one of said speed stages which is set up with engine braking when at least the friction engaging means is engaged and which may be set up without engine braking when the friction engaging means is disengaged, and a third one of said speed stages which may be set up when the friction engaging means is disengaged, said hydraulic control device comprising:
   a first and a second passage for supplying a hydraulic pressure to said friction engaging means in parallel with one another, said first passage having substantially less fluid flow resistance than said second passage, and
   a fluid flow switching over means for alternatively communicating said first passage while interrupting said second passage or communicating said second passage while interrupting said first passage according to whether said first one of said speed stages or said second one of said speed stages is set up.
2. A hydraulic control device according to claim 1, wherein said second passage includes at a part thereof an accumulator.
3. A hydraulic control device according to claim 2, wherein said second passage includes a one way valve at a part thereof extending between said friction engaging means and said accumulator for allowing fluid to flow only in one direction toward said friction engaging means.
4. A hydraulic control according to claim 2, wherein said clutch is further engaged in another speed stage lower than said first one of said speed stages, and said first passage is connected with a part of said second passage extending between said accumulator and a one way valve in said second passage via a throttled passage.

* * * * *